Sept. 30, 1941. A. HOCK 2,257,686
STRAINER
Filed Sept. 23, 1938 3 Sheets-Sheet 1
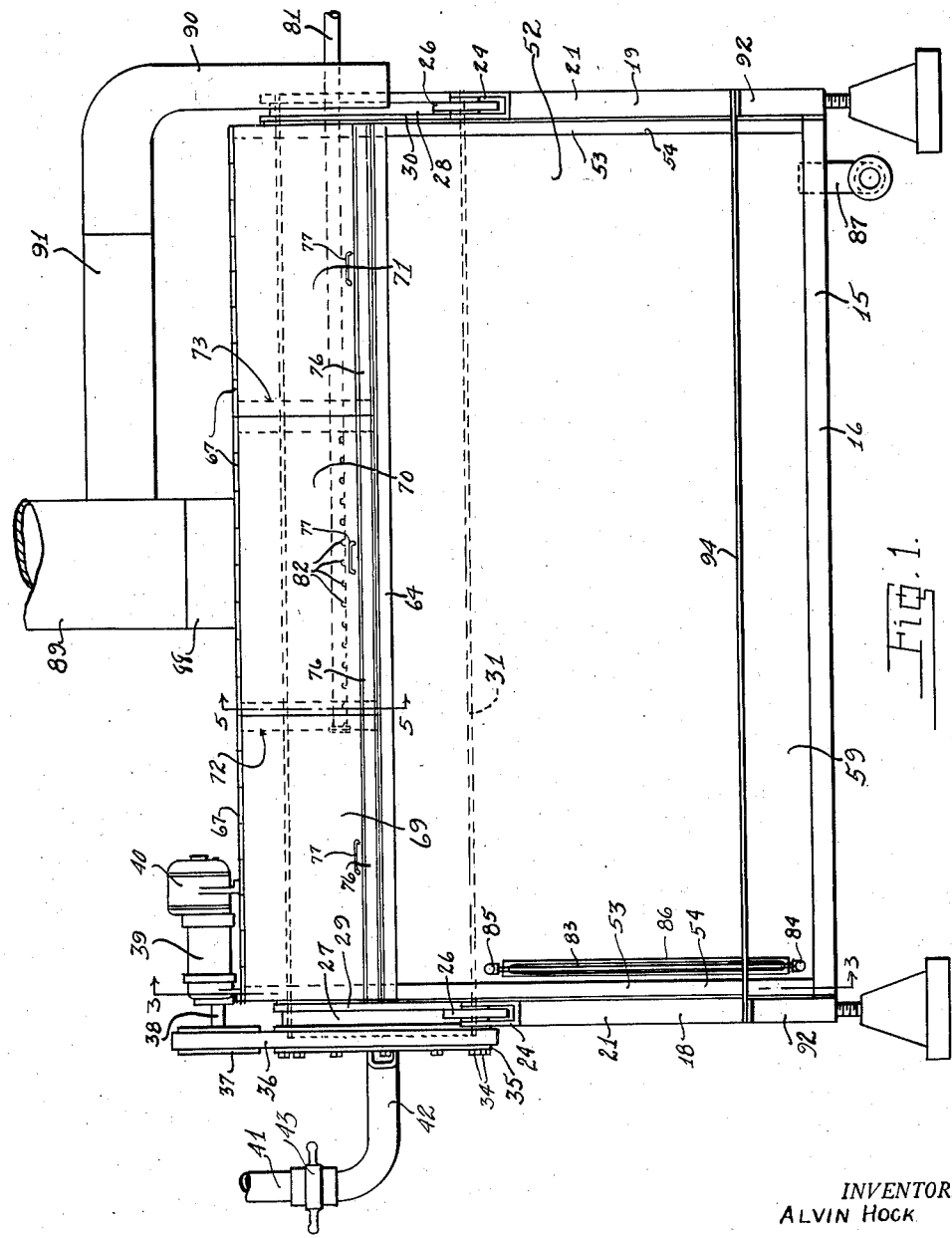
INVENTOR.
ALVIN HOCK
BY Joseph A. Rave
ATTORNEYS.

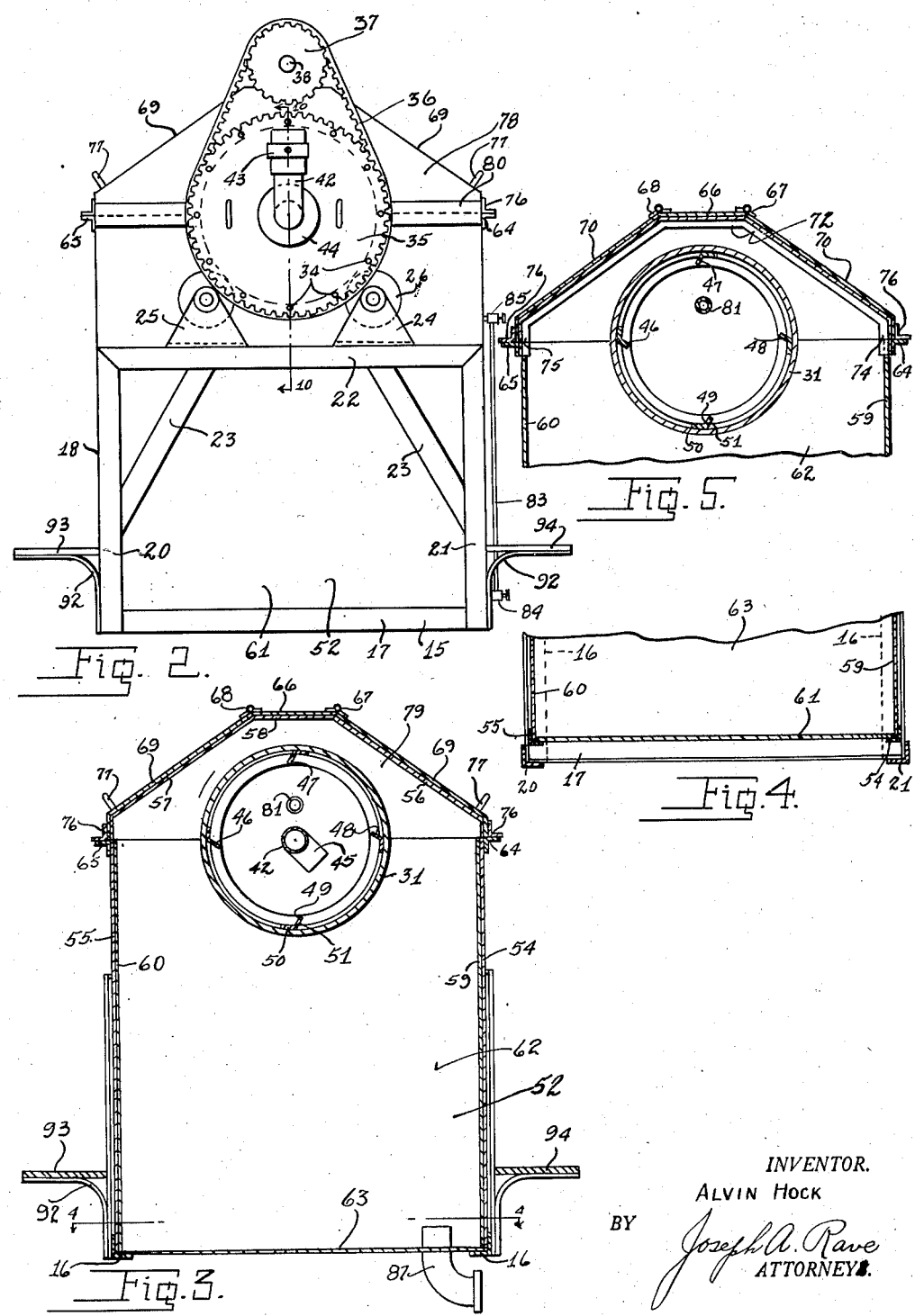

Sept. 30, 1941. A. HOCK 2,257,686
STRAINER
Filed Sept. 23, 1938 3 Sheets-Sheet 3
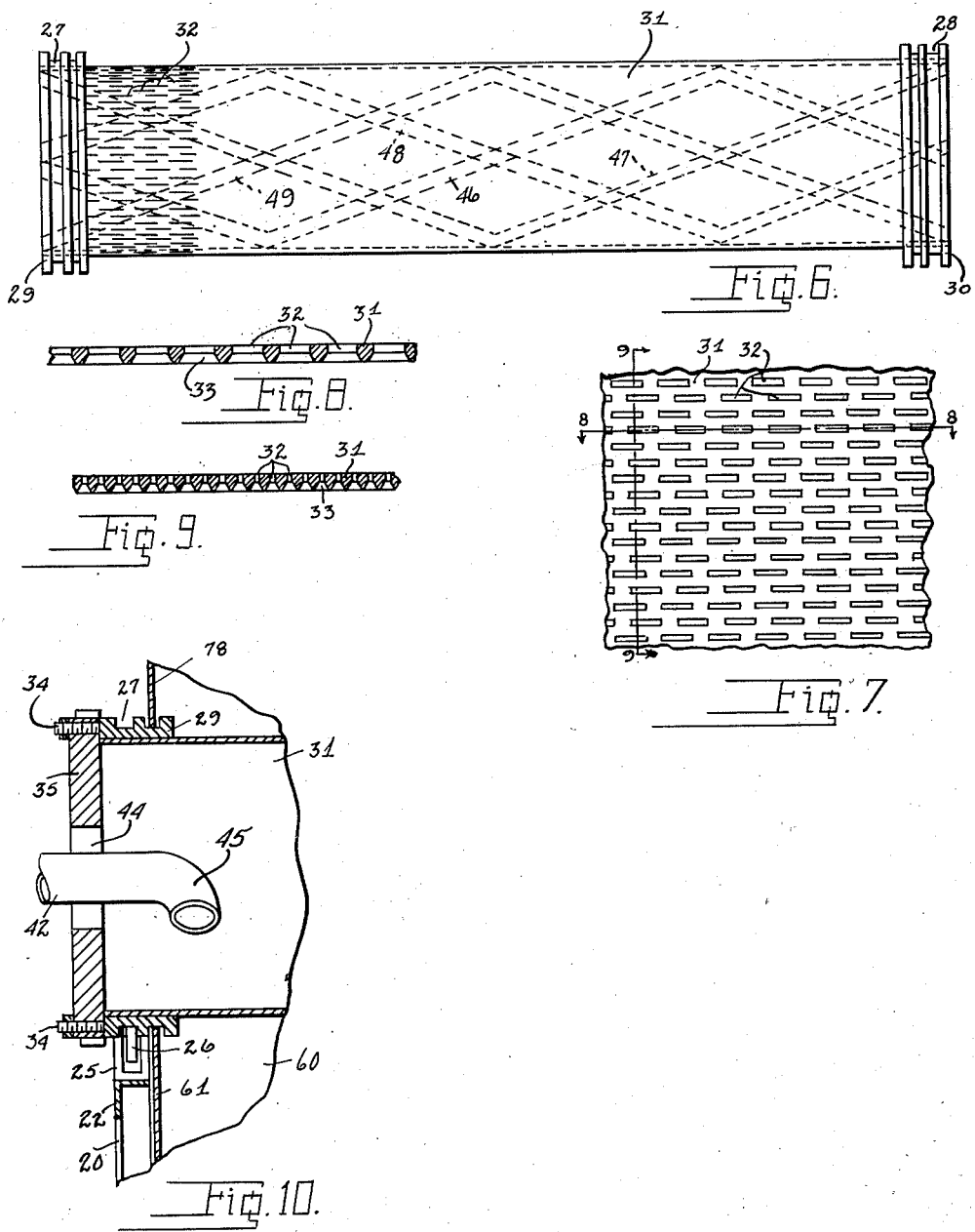
INVENTOR.
ALVIN HOCK
BY Joseph A. Rave
ATTORNEYS.

Patented Sept. 30, 1941

2,257,686

UNITED STATES PATENT OFFICE 2,257,686

STRAINER

Alvin Hock, Cincinnati, Ohio

Application September 23, 1938, Serial No. 231,400

9 Claims. (Cl. 210—199)

This invention relates to improvements in a mechanism for straining or separating wort from hops.

In the past, hop strainers have been provided which consisted primarily of a perforated basket, into which the hops were discharged to allow the syrup or wort to drain, but the moist hop flowers or blossoms would pack and thereby prevent the complete drainage of the syrup and resulting in a loss because of the retained wort or syrup. Other hop strainers have taken the form of an elongated screen, relative to which the wet mass was pushed during the drainage, but, like the basket type of strainer, the hop flowers would pack and retain a considerable portion of the wort or syrup, which would be lost. In each of these prior strainers, considerable wort and syrup was lost, even though the mass was sparged prior to the final disposal of the hop, because of this packing of the hops.

One of the principal objects of the present invention, therefore, is the provision of a hop strainer which is efficient in operation and which will remove a maximum amount of wort and syrup from the mass, leaving only the hop flowers from which all of the syrup has been drained.

Another object of this invention is the provision of a strainer as above identified, in which the mass is kept in a state of agitation, or tumbling, thereby preventing the hop flowers or blossoms from packing until the syrup or wort is removed therefrom, and in which the said hop flowers or blossoms can be readily and efficiently sparged.

Another object of this invention is the provision of a hop strainer, which, while efficiently removing the syrup from the brew mass, disposes of the residue, such as the hop flowers or blossoms, and the like, so as not to interfere with the supply of the brew mass to the strainer and disposing of this material as rapidly as it is presented to the strainer.

A further object of this invention is the provision of a strainer which can be readily and efficiently cleaned, thereby reducing to a minimum the time usually consumed in keeping the machinery used in breweries in a clean and sanitary condition. It should be noted here that facility of cleaning of any piece of machinery used in a brewery is a very important consideration.

Other objects and advantages of the present invention should be readily understood by reference to the following specification when considered in connection with the accompanying drawings and forming part thereof, and it is to be understood that any modifications may be made in the exact structural details therein shown, without departing from or exceeding the spirit of the invention, as defined by the appended claims.

In the drawings—

Fig. 1 is a side elevation of the hop strainer of this invention.

Fig. 2 is an end elevation of the strainer as seen from the left hand end of Fig. 1.

Fig. 3 is a vertical, sectional view, just behind the front end of the strainer, taken on line 3—3 of Fig. 1.

Fig. 4 is a fragmentary, horizontal, sectional view, taken on line 4—4 of Fig. 3.

Fig. 5 is a fragmentary, vertical, sectional view, taken on line 5—5 of Fig. 1.

Fig. 6 is an elevational view of the drum strainer, forming a detail of the invention.

Fig. 7 is an enlarged plan view of a portion of the strainer, as seen from the inside of the strainer drum.

Fig. 8 is a sectional view through the strainer material, taken on line 8—8 of Fig. 7.

Fig. 9 is a view similar to Fig. 8, taken at right angles to Fig. 8, on line 9—9 of Fig. 7, and, Fig. 10 is an enlarged, fragmentary, sectional view through the loading end of the strainer, taken on line 10—10 of Fig. 2.

Throughout the several views of the drawings, similar reference characters are employed to denote the same or similar parts.

The so-called strainer or separator of this invention is comparatively large, having a capacity of strained wort or syrup of upwards of twenty five barrels, and the size being dependent solely on the size or capacity of the brewery where it is to be employed.

Specifically, and referring to the drawings, the strainer of this invention comprises a base frame 15 formed of longitudinal angle irons 16 and transverse angle irons 17. The transverse angle irons 17, located at opposite ends of the strainer, are parts of frame ends 18 and 19, each of which include vertical angle irons 20 and 21 and upper transverse angle iron 22. The vertical angle irons 20 and 21, and upper horizontal angle iron 22, are further connected to one another, and braced by braces 23.

The upper horizontal angle iron 22 of the end frame 18 and 19 is provided with a pair of roller supports 24 and 25, U-shaped in cross section, as seen in Fig. 1. Each of these supports 24 and 25, has journaled at its upper end a roller 26 adapted to enter grooves 27 and 28, formed in end castings 29 and 30, for the drum strainer indicated in general by the reference character 31. This drum strainer 31 is cylindrical in form and provided with elongated perforations 32 throughout the length and breadth of the body portion. As seen in Figs. 7, 8 and 9, the strainer is provided with relatively narrow elongated apertures on the surface presented to the material to be strained, and which apertures are enlarged as at 33 on the reverse side of this material. This type of strainer material has been used for straining purposes in the past.

The circular casting 29, at the loading end of the strainer, is provided with a plurality of studs 34 projecting outwardly therefrom and which pass through a large gear 35. This gear 35 may be an ordinary spur gear, or, as illustrated in the drawings, a sprocket or chain gear, about which is trained an endless chain 36, see Fig. 2. This chain 36 is in turn trained about a second gear or pinion 37 secured to the free end of a shaft 38. The shaft 38 may be a motor shaft, or, as illustrated, the final shaft of a gear box 39 which has its primary shaft connected with the shaft of a motor 40.

From the foregoing, it will be seen that there has been provided a frame supporting an apertured cylinder or strainer which is adapted to be suitably driven or rotated while being supported on a plurality of rolls. This cylinder or drum has its front end closed by the gear 35, which is secured to the grooved casting or roll 29, and has its other or discharge end open through the roll or cylindrical casting 30.

The material to be strained, including the hop flowers or blossoms, as is well known, is cooked or brewed in a kettle, and this material discharged into a delivery pipe or conduit 41. The delivery pipe or conduit 41 is connected with the strainer pipe or conduit 42 by means of a removable coupling 43. This intake pipe or conduit 42 of the strainer, passes through an aperture or bearing 44, in the gear 35, to the interior of the strainer drum. Interiorly of the strainer drum, the intake pipe or conduit 42, is provided with an elbow 45 which directs the material being operated upon against the inner surface of the drum. As seen in Figs. 3 and 10, the discharge end of the intake 42 is directed downwardly and outwardly with respect to the axis of the drum. In this way, and with the drum constantly rotating the material discharged is moved away from the point of deliverance as rapidly as delivery takes place.

With reference to Figs. 3, 5 and 6, it will be noted that the drum has secured to its inner surface a plurality of ribs, shown as four in number, and indicated by the reference characters 46, 47, 48 and 49. These ribs are in effect angle irons, each having one arm 50 secured to the inner surface of the drum, and each having its other arm 51 projecting toward the center of the drum. During rotation of the drum, these arms carry with them the hop flowers or blossoms, and, at the same time, effect an agitation or tumbling of these blossoms, thereby presenting all sides of the blossoms to positions to cause effective drainage thereof. In order to assist in the agitation and tumbling of the blossoms, the said inwardly projecting arms 51 of the ribs are inclined in the direction away from the direction of rotation of the drum, so as to allow the hop blossoms or flowers to readily roll toward the center of the drum during its rotation, and not bank or pack up along side of said ribs and be carried to the top of the drum, as would be the case if they were at right angles to the surface of the drum. These ribs 46, 47, 48 and 49 are secured to the inner surface of the strainer-drum in a spiral form, as shown most clearly in Fig. 6. The effective result as seen in Fig. 6, is that of a quadruple screw, the said spiral formation of the ribs acting as a conveyor screw for the hop flowers or blossoms in actuating the same from the intake to the discharge end of the strainer-drum.

The speed of rotation of the drum and the angle of pitch of the ribs will be geared to the rate of flow of the material through the pipes 41 and 42 to the interior of the drum, so that the hop flowers or blossoms is actuated through the drum at substantially the rate of delivery thereto, so as to prevent packing up of said hop blossoms or flowers within the interior of the drum.

The wort or syrup, drained and removed from the hop flowers or blossoms within the strainer-drum, is collected in a tank indicated in general in Fig. 1 by the reference character 52, which is located within the main frame of the machine. Specifically, this tank 52 is provided at its opposite ends with a pair of frames each formed of an angle iron 53. One of said angle irons or tank end frames is shown in section in Fig. 3, and has portions 54 and 55 upstanding and parallel with one another, respectively integral with portions 56 and 57, which incline toward one another, pyramid fashion, and a central portion 58, for connecting the portions 56 and 57, as clearly illustrated in Fig. 3. The portions 54 and 55, of the angle iron 53, have secured to their opposed legs sheet metal plates 59 and 60, which, respectively, provide the longitudinal sides of the tank 52. These tank sides 59 and 60 extend to a heighth on a line with the axis of the strainer-drum. The remaining legs of the portions 54 and 55, of the angle irons 53, have secured to them, end plates 61 and 62 which form the ends of the tank 52. The lower edges of the side plates 59, 60, 61 and 62 are secured to the edges of a plate 63 which forms the bottom of the tank proper.

The tank frame angle irons 53 are secured at opposite ends to one another by longitudinal angle irons 64 and 65 which form in effect the top rail of the sides of the tank proper. The upper, central, longitudinal portions 58, of the tank frame angle irons 53, has secured thereto a plate 66 which forms in effect the top of the machine as a whole, and at the same time forms a support for the driving motor 40, as seen most clearly in Fig. 1. This top plate 66, in addition, is provided, along its longitudinal edges, with hinges 67 and 68, for securing thereto hinged lids, whereby access may be had to the interior of the strainer as a whole.

As seen in Fig. 1, there are three lids, 69, 70 and 71, along each side of the strainer which may be individually raised in order to gain access to the interior of the strainer at either of these points. The end lids 69 and 71, each have one edge, when in closed position, resting on the tank frame angle irons 53, and have their other edges respectively on inner angle iron frames 72 and 73, located intermediate the ends of the tank end frames 53, illustrated in Fig. 5. As shown in this Fig. 5, the angle iron frame 72 has portions correspondingly similar to the portions 56, 57 and 58 in contour of the end tank frames 53, as well as at vertical portions 74 and 75, which are similar to the portions 54 and 55, of said tank end frames 53. The legs 74 and 75, of the frame 72, extend to the bottom of the tank top angle irons 64 and 65, and are respectively secured to one another. These frames 72 and 73, as seen in Fig. 1, form the supports for the ends of the intermediate lid 70. In order to strengthen the free ends of said lids, 69, 70 and 71, they are each provided, throughout their length, with a similar angle iron 76, and to facilitate the raising and lowering of the lids, they are each provided with a similar handle 77. The end portions of the strainer as a whole, above the ends 61 and 62 of the tank proper, are closed by substantially triangular shaped end plates 78 and 79, which are secured to one leg of the portions 56, 57 and 58, of the tank end frames 53. The contacting edges of the plates 78 and 79, with plates 61 and 62 respectively, may be joined by welding or an external reinforcing strap 80 may be supplied and secured to this joint.

From the foregoing, it will now be seen that the syrup or wort, removed from the brewed mass supplied to the screen drum, is collected in a suitable tank, and that the said screen drum rotates in a substantially closed tank. The major portion of the wort or syrup will be removed from the brewed mass as it is passing through the first third of the screen drum, or that portion of the screen drum located immediately below the screen lids 69. This wort or syrup has a certain affinity for the hop blossoms or flowers, and, in order to completely remove the said syrup, it should be washed or sparged off. In order to effect this sparging, a pipe 81, connected with a water source, is projected into the open end of the screen drum, and the sparging takes place after passing the primary filtering station. For this reason, and as seen in Fig. 1, the sparging pipe 81 stops at approximately the end of the primary filtering station of the screened drum, and the portion of the sparging pipe 81 lying within this zone of the screen drum is provided with a series of small apertures 82 to provide jets or streams of water for the hop flowers or blossoms while they are passing this portion of the screen drum. The syrup removed from the hop flowers or blossoms by this spraying is again collected by the tank 52. The portion of the screen drum beyond the sparging station is utilized for the final draining of the syrup from the brewed material passing therethrough. In order to keep the operator advised of the content and height of the syrup within the drum 52, a gauge glass 83 is provided, having its opposite ends connected respectively with couplings 84 and 85, which, in turn, have communication with the interior of the tank. In order to protect the gauge glass, a suitable perforated guard, 86, as is usual practice, may be provided therearound. Any suitable opening may be provided through the tank for discharging the syrup therefrom. Such a discharge arrangement being shown as a flanged outlet pipe 87.

It is believed that the operation of this strainer as a whole is well understood from the foregoing description. The brewed mass being delivered to the strainer by way of pipes 41 and 42 to the strainer-drum which is being rotated and tumbling this mass, and allowing the syrup or wort to separate therefrom and, at the same time, project the solid particles of the brewed mass through the strainer to the discharge end. As the mass is progressing through the strainer-drum, it is sparged to effect the complete removal of the syrup or wort therefrom.

As is well known, this brewed mass has just left the boiling kettle, and is, therefore, quite hot and emitting considerable steam. In order to dispose of said steam, the top plate 68 of the strainer is provided, substantially centrally of its length, with an outlet 88, connected by a suitable pipe or the like, 89, with a stack or other vent. Since the sparging water is cooler than the brewed mass passing through the screen drum, the greatest steam will emanate at the sparging station, which, as illustrated in the drawings, is immediately below the outlet 88, and the discomfiture resulting from this steam is thereby effectively eliminated. The solid matter of the brewed mass is ejected from the end of the screen drum either directly onto the floor adjacent the strainer, or into a receptacle (not shown) placed there to receive the same and has a considerable amount of steam being emitted therefrom, and there has been placed above this discharge end of the strainer, a hood 90, connected by a branch conduit 91 with conduit or pipe 89 and stack. By this arrangement, the steam around the strainer is effectively held at a minimum.

As was noted above, it is necessary to frequently clean and scour the interior surfaces of the screen drum and tank, as well as the exterior surface of the screen drum. In order to obtain access to the interior of the screen drum, use is made of the open discharge end by inserting the usual scouring and cleaning brushes, or the like, and substantially cleaning the rear half of the screen drum, while, in order to clean the front half of the screen drum, the nuts on the studs 34 are removed to permit displacement of the gear 35 after having first uncoupled the coupling 43, so that the intake pipe 42 is removed with the gear 35. The exterior of the screen drum 31 is of course cleaned through the raising of the lids 69, 70 and 71. The space provided between the periphery of the screen drum and edge of the tank proper is utilized to permit the insertion of cleaning and scouring brushes and brooms in order to clean the inner surfaces of the tank 52. To assist in the cleaning of the exterior of the screen drum and interior of the tank, the main end braces 18 and 19 are each provided, on opposite sides thereof, with similar brackets 92 and walks 93 and 94.

From the foregoing, it will now be appreciated that there has been provided a hop strainer, for straining or removing wort or syrup from a brewed mass, and which strainer will efficiently operate and otherwise accomplish the objects initially set forth above.

What is claimed is:

1. In a mechanism of the class described, the combination of a tank having a bottom, ends, sides and top, frame members exteriorly of the tank and adjacent the ends thereof, a perforated cylinder extending longitudinally of the tank and located intermediate the bottom and top thereof, end castings for said cylinder each having an annular trackway, means on the exterior frame members engaging the end castings annular trackway for supporting the drum for rotation, removable means for closing one end of the screen drum and including the driven member of a drum rotating transmission, means including a motion transmitting train for rotating the screen drum, means for supplying material to the interior of the drum and operable through the screen drum closure member, said drum having its other end open and forming the discharge for the material passing through the screen drum, and means associated with said screen drum for effecting the movement of the material through the drum from the closed end to the discharge end thereof.

2. In a mechanism of the class described, the combination of a tank having a bottom, ends, sides, and top, frame members exteriorly of the tank and adjacent the ends thereof, a perforated cylinder extending longitudinally of the tank and located intermediate the bottom and top thereof, sides, and top, frame members exteriorly of the cylinder each having an end castings for said cylinder each having an annular trackway, means on the exterior frame members engaging the end castings annular trackway for supporting the drum for rotation, removable means for closing one end of the screen drum and including the driven member of a drum rotating transmission, means including a motion transmitting train for rotating the screen drum, means for supplying material to the interior of the drum and operable through the screen drum closure member, said drum having its other end open and forming the discharge for the material passing through the screen drum, means associated with said screen drum for effecting the movement of the material through the drum from the closed end to the discharge end thereof, and means for sparging the material within the screen drum at a point during its movement therethrough.

3. In a mechanism of the class described, the combination of a tank having a bottom, ends, sides and top, frame members exteriorly of the tank and adjacent the ends thereof, a perforated cylinder extending longitudinally of the tank and located intermediate the bottom and top thereof, end castings for said cylinder each having an annular trackway, means on the exterior frame members engaging the end castings annular trackway for supporting the drum for rotation, removable means for closing one end of the screen drum and including the driven member of a drum rotating transmission, means including a motion transmitting train for rotating the screen drum, means for supplying material to the interior of the drum and operable through the screen drum closure member, said drum having its other end open and forming the discharge for the material passing through the screen drum, means associated with said screen drum for effecting the movement of the material through the drum from the closed end to the discharge end thereof, and a sparging pipe extending through the open end of the screen drum to the interior thereof for sparging the material during its movement through the screen drum from the closed to the open end thereof.

4. In a mechanism of the class described, the combination of a frame, a tank within said frame including a bottom, upstanding ends and sides, and a top, a portion of which is flat with adjacent portions on each side thereof inclined toward the tank sides and hinged to the flat top portion whereby the inclined top portions may be raised to permit access to the inside of the tank, a screen drum within the tank adjacent the top portion whereby the exterior of the drum and interior of the tank are accessible through the raised inclined top portions of the tank, end castings at the ends of the screen drum projecting through the tank ends and having annular trackways, peripheral supporting rollers beyond the tank for supporting the screen drum end castings, removable closure means at one end of the screen drum, removable to permit access to the interior of the screen drum, and means for rotating the screen drum.

5. In a mechanism of the class described, the combination of a frame, a tank within said frame including a bottom, upstanding ends and sides, and a top, a portion of which is flat with adjacent portions on each side thereof inclined toward the tank sides and hinged to the flat top portion whereby the inclined top portions may be raised to permit access to the inside of the tank, a screen drum within the tank adjacent the top portion whereby the exterior of the drum and interior of the tank are accessible through the raised inclined top portions of the tank, end castings at the ends of the screen drum projecting through the tank ends and having annular trackways, peripheral supporting rollers beyond the tank for supporting the screen drum and castings, removable closure means at one end of the screen drum, removable to permit access to the interior of the screen drum, means for rotating the screen drum, means for supplying material to the interior of the screen drum to a point adjacent the closure means, said screen drum having its other end open for discharge purposes, and ribs secured to the interior of the screen drum projecting toward the center thereof and extending spirally axially of the drum for feeding material from the closed end of the drum to the open end thereof.

6. In a mechanism of the class described, the combination of a frame, a tank within said frame including a bottom, upstanding ends and sides, and a top, a portion of which is flat with adjacent portions on each side thereof inclined toward the tank sides and hinged to the flat top portion whereby the inclined top portions may be raised to permit access to the inside of the tank, a screen drum within the tank adjacent the top portion whereby the exterior of the drum and interior of the tank are accessible through the raised inclined top portions of the tank, end castings at the ends of the screen drum projecting through the tank ends and having annular trackways, a peripheral supporting rollers beyond the tank for supporting the screen drum and castings, removable closure means at one end of the screen drum, removable to permit access to the interior of the screen drum, means for rotating the screen drum, means for supplying material to the interior of the screen drum to a point adjacent the closure means, said screen drum having its other end open for discharge purposes, and ribs secured to the interior of the screen drum projecting toward the center thereof and extending spirally axially of the drum for feeding material from the closed end of the drum to the open end thereof, and a sparging pipe extending into the screen drum for sparging the material at a point during its movement from the closed to the open ends of the screen drum.

7. In a mechanism of the class described the combination of a completely enclosing tank, including sides and top, a perforated screen drum within the tank, having one end open and the other closed supporting castings at the opposite ends of said drum each having an annular supporting trackway and projecting through and beyond the tank sides, and means for engaging the casting's annular trackways and supporting the drum for rotation, and said closed end of the drum and the tank top being displaceable whereby access to the interior of the drum may be had from each end thereof and whereby access to the exterior of the drum and to the interior of the tank may be had through the tank top.

8. In a mechanism of the class described the combination of a completely enclosing tank, including sides and top, a perforated screen drum within the tank, having one end open and the other closed supporting castings at the opposite ends of said drum each having an annular supporting trackway and projecting through and beyond the tank sides, and means for engaging the casting's annular trackways and supporting the drum for rotation, and said closed end of the drum and the tank top being displaceable whereby access to the interior of the drum may be had from each end thereof and whereby access to the exterior of the drum and to the interior of the tank may be had through the tank top and displaceable feeding means extending through the drum closed end for supplying material to the interior of the drum.

9. In a mechanism of the class described the combination of a completely enclosing tank, including sides and top, a perforated screen drum within the tank, having one end open and the other closed supporting castings at the opposite ends of said drum each having an annular supporting trackway and projecting through and beyond the tank sides, and means for engaging the casting's annular trackways and supporting the drum for rotation, and said closed end of the drum and the tank top being displaceable whereby access to the interior of the drum may be had from each end thereof and whereby access to the exterior of the drum and to the interior of the tank may be had through the tank top and displaceable feeding means extending through the drum closed end for supplying material to the interior of the drum and a sparging means extending through the open end of the drum toward the closed end thereof for sparging the material within the drum.

ALVIN HOCK.